(12) United States Patent
Girardey

(10) Patent No.: US 11,768,750 B2
(45) Date of Patent: Sep. 26, 2023

(54) METHOD FOR IMPROVING THE MEASURING PERFORMANCE OF AN AUTOMATION FIELD DEVICE TO BE CONFIGURED

(71) Applicant: Endress+Hauser SE+Co. KG, Maulburg (DE)

(72) Inventor: Romuald Girardey, Blotzheim (FR)

(73) Assignee: Endress+Hauser SE+Co. KG, Maulburg (DE)

( * ) Notice: Subject to any disclaimer, the term of this patent is extended or adjusted under 35 U.S.C. 154(b) by 309 days.

(21) Appl. No.: 17/293,466

(22) PCT Filed: Oct. 31, 2019

(86) PCT No.: PCT/EP2019/079869
§ 371 (c)(1),
(2) Date: May 12, 2021

(87) PCT Pub. No.: WO2020/099139
PCT Pub. Date: May 22, 2020

(65) Prior Publication Data
US 2022/0004476 A1    Jan. 6, 2022

(30) Foreign Application Priority Data

Nov. 12, 2018  (DE) ...................... 10 2018 128 254.0

(51) Int. Cl.
  *G06F 9/44*    (2018.01)
  *G06F 11/34*   (2006.01)
  *G06F 9/445*   (2018.01)
(52) U.S. Cl.
  CPC ...... *G06F 11/3409* (2013.01); *G06F 9/44505* (2013.01)

(58) Field of Classification Search
  None
  See application file for complete search history.

(56) References Cited

U.S. PATENT DOCUMENTS

| 5,439,160 A | 8/1995 | Marcantonio | |
| 2014/0032972 A1* | 1/2014 | Ramachandra | G06F 11/26 714/37 |
| 2016/0041743 A1* | 2/2016 | Kilian | G06F 3/04842 715/747 |

FOREIGN PATENT DOCUMENTS

| DE | 102004014338 A1 | 10/2004 |
| DE | 102007039531 A1 | 2/2009 |

(Continued)

*Primary Examiner* — Keshab R Pandey
(74) *Attorney, Agent, or Firm* — Kelly J. Smith; Endress+Hauser (USA) Holding, Inc.

(57) ABSTRACT

The present disclosure relates to a method for improving the measuring performance of a field device having the following steps: a multiplicity of field devices are configured using a configurations tool; the configuration data and environmental conditions of the field devices at the respective measuring positions are stored in a central data memory as training data, the training data are made available to an adaptive computing program which uses at least one artificial intelligence method; current information relating to the particular application and the environmental conditions at the measuring position of the field device are made available to the adaptive computing program; on the basis of the current information, the adaptive computing program provides the field device to be configured with configuration data on the basis of the multiplicity of training data, which configuration data are matched to the particular application taking into account the environmental conditions.

9 Claims, 1 Drawing Sheet

Phase 1
Learning phase

(56) References Cited

FOREIGN PATENT DOCUMENTS

| | | |
|---|---|---|
| DE | 102010027144 A1 | 1/2012 |
| DE | 102016010048 A1 | 3/2017 |
| DE | 102017200134 A1 | 7/2018 |
| WO | 2015075615 A1 | 5/2015 |
| WO | 2015135559 A1 | 9/2015 |

* cited by examiner

METHOD FOR IMPROVING THE MEASURING PERFORMANCE OF AN AUTOMATION FIELD DEVICE TO BE CONFIGURED

CROSS-REFERENCE TO RELATED APPLICATIONS

The present application is related to and claims the priority benefit of German Patent Application No. 10 2018 128 254.0, filed on Nov. 12, 2018 and International Patent Application No. PCT/EP2019/079869, filed on Oct. 31, 2019, the entire contents of which are incorporated herein by reference.

TECHNICAL FIELD

The invention relates to a method for improving the measuring performance of a field device which is to be configured, is installed in a defined application and determines or monitors at least one physical or chemical process variable of a medium in an automation installation.

BACKGROUND

In automation installations, in particular in process and factory automation installations, field devices serving to detect and/or influence process variables are frequently used. To capture process variables of a gaseous, liquid or solid medium, sensors are used that are integrated in, for example, fill-level measuring devices, flow meters, pressure and temperature measuring devices, pH-redox potential meters, conductivity meters, spectrometers etc., which capture the respective process variables, being fill level, flow rate, pressure, temperature, pH value, conductivity chemical composition of the medium.

Actuators, such as, for example, valves or pumps, are used to influence process variables. The flow rate of a fluid in a pipeline section or a filling level in a container can thus be altered by means of actuators. Field devices, in general, refer to all devices which are process-oriented and which supply or process process-relevant information. In the context of the invention, field devices also refer to remote I/Os, radio adapters, and, in general, devices that are arranged in an automation installation. A variety of such field devices is manufactured and marketed by the Endress+Hauser company.

Field devices are often very complex; they are commensurately difficult to configure. An example which may be mentioned is a radar level measuring device which operates according to the runtime principle. This device has a number of parameters which have to be configured according to the respective application. In addition, the field device in the application/in the process can also be exposed to a plurality of disturbance variables, which also have to be taken into account in the configuration or parameterization. Nowadays, a configuration or the elimination of a disturbance of a field device is carried out on site by the service technician. He first attempts to understand the problem and then to find a correct configuration for the field device. To ensure that the solution found works, both sound knowledge in the art relating to the field device and knowledge in the art relating to the process in which the field device is installed are required. Furthermore, the service technician must also know all the problems that could possibly occur in an application along with the solution options for eliminating the problem which has occurred in each case.

The invention is based on the object of configuring a field device in a simple manner in such a way that it operates with a measurement performance matched to the process, that is to say optimum.

SUMMARY

The object is achieved by a method for improving the measuring performance of a field device which is to be configured, is installed in a defined application and determines or monitors at least one physical or chemical process control in an automation system, with the following method steps:

a plurality of field devices which determine or monitor different physical or chemical process variables in different applications and under different environmental conditions prevailing at the respective measuring positions of the field devices are configured or parameterized by means of a configurations tool, the configuration data, the information relating to the respective applications and the information relating to the environmental conditions of the individual field devices prevailing at the respective measuring positions are stored in a central data memory as training data; the training data are made available to an adaptive computing program, which uses at least one artificial intelligence method; and for the purpose of configuring or parametrizing the field device to be configured, current information relating to the particular application and the environmental conditions prevailing at the measuring position of the field device to be configured are made available to the adaptive computing program, on the basis of the current information, the adaptive computing program provides the field device to be configured with configuration data on the basis of the plurality of training data, which configuration data are matched to the particular application taking into account the environmental conditions prevailing at the measuring position of the field device to be configured.

What is meant by "field devices" in the context of the invention has already been defined in detail in the introduction to the description. There is no need for repetition. In particular, physical or chemical measurands, which have an influence on the field device, in particular on the aging of the field device, are used as environmental information. The environmental information can be determined quantitatively and/or qualitatively. Quantitatively means in this context that the variables of measuring devices are measured; qualitatively means that their effects on the field devices are determined with sufficient accuracy. An example which may be mentioned here is a pump which is operated periodically and which causes slight, medium or strong vibrations during operation.

By means of the method according to the invention, it is possible to equip a field device with configuration data which are optimally adapted to the particular application in which the field device is installed. By continuously improving and optimizing the configuration data of a plurality of field devices (Big Data) it is ultimately possible to find the optimum configuration for a field device in an application, without the service personnel having to have specialist knowledge. The adaptive AI-based computing program learns via a plurality of configuration data and environmental information of field devices and subsequently assumes the configuration automatically, or it functions—at least in a so-called "auxiliary phase"—as a configuration aid. If information is missing from the adaptive computing program, it makes contact with the service personnel or a suitable database and requests the missing information.

According to a development of the method according to the invention, the calibration data and the environmental information are stored in the database. This is preferably a cloud-enabled database due to the large quantity of data which, in some cases, are determined and collected worldwide at different positions.

In the wake of the buzzwords "Industrial Internet of Things (IIoT)" and "Industry 4.0", data from industrial plants are increasingly stored on so-called "cloud-enabled databases." A cloud-enabled database is understood to be a database which is compatible with cloud computing technology. In this case, cloud computing is understood to mean storing information and accessing the stored information using the Internet.

So-called "application program interfaces," referred to as "API" for short, are used to access such a database and to exchange data. Such APIs define the commands and access types permitted on a database. Prior to access, the API can request authentication from the user. This authentication is usually realized using a key (a so-called "API key"). Such technologies are preferably used in conjunction with the method according to the invention.

It is considered advantageous in connection with the method according to the invention if the adaptive computing program or the mathematical model works with the methods of machine learning. In particular, it is provided that the adaptive computing program uses at least one neural network. Alternative embodiments of the method according to the invention use the nearest neighbor method, decision trees and/or a support vector machine. Further variants which can be used in conjunction with the solution according to the invention are the methods of linear or nonlinear regression, ensembles, Naive Bayes or logistic regression. These and other suitable methods from the field of artificial intelligence, which are used for the adaptive computation program, have become known, for example, from the textbook "Grundkurs Künstliche Intelligenz", 4th edition by Prof. Ertl.

The calculations are preferably carried out in a cloud application. Alternatively, the adaptive computing program can also be installed on an operating tool.

In industrial plants, the communication between at least one superordinate control unit and the field devices generally takes place via a bus system, such as, for example, Profi-Bus® PA, Foundation Fieldbus®, or HART®. The bus systems can be embodied to be both wired and wireless. The superordinate control unit is used for process control, for process visualization, for process monitoring and for starting and operating the field devices and is also referred to as a configuration/management system. It has also become known to equip field devices with Internet interfaces for communication and/or energy supply.

Automation technology field devices are also or exclusively equipped with a near-field communication interface. A corresponding near-field communication interface (NFC interface) is preferably a standardized interface, for example a Bluetooth or a Bluetooth low energy (BLE) interface, which has a range of up to approximately 100 m. Using a corresponding app, the field devices can then be operated by means of commercially available communication tools (smartphone, tablet, laptop, . . . ). The aforementioned communication possibilities of the field devices can of course also be used—individually or in combination—in conjunction with the solution according to the invention.

An advantageous further development of the method according to the invention proposes that the configuration data and the current information about the respective application and the environmental conditions prevailing at the measuring position of the field device to be configured are stored in the central database. In the context of the invention, at least one of the known wireless or wired communication methods is used for transmitting the configuration data.

The training data for the adaptive computing program are preferably obtained during start-up or within the framework of a maintenance or service assignment.

Furthermore, the following is provided: In the event that a malfunction occurs at a field device, which requires a subsequent service or maintenance assignment of the service personnel, information regarding the malfunction and information for correcting the malfunction is stored in the central data memory.

If a malfunction occurs at one of the field devices requiring a subsequent service or maintenance assignment of a service technician, wherein the original configuration data is changed during the subsequent service or maintenance assignment, the following is provided: The original configuration data, optionally also the original information about the respective application and the environmental conditions prevailing at the measuring position of the field device, are replaced in the central data memory by the changed configuration data and/or changed information about the respective application and the environmental conditions prevailing at the measurement position of the field device. Alternatively, the stored data is time-stamped.

In addition, it is proposed that after the learning phase of the computing program, which uses at least one artificial intelligence method, the start-up, troubleshooting or maintenance of the field devices takes place via untrained operating personnel or automatically—this is the automatic configuration phase of a field device.

If the respective application and the environmental conditions prevailing at the measuring position of the field device are known, it is proposed that the field device which is to be calibrated, for example at the time of the initial installation, is preset with configuration data that are already matched to the respective application taking into account the environmental conditions prevailing at the measuring position of the field device which is to be configured.

If, at a future (later) point in time, a change is made to the configuration data of a field device in order to improve the measurement performance, then all field devices are provided, via untrained personnel or automatically, with corresponding changed configuration data, which are matched to the respective application taking into account the environmental conditions prevailing at the respective measuring position of the field devices.

The configuration data or changed configuration data, which are matched to the respective application taking into account the environmental conditions prevailing at the respective measuring position of the field devices, are preferably provided via the Internet or intranet. The communication takes place essentially between the intelligent field device and the adaptive computing program. For example, the adaptive computing program is integrated into the field device itself. At that point, it is an intelligent field device

BRIEF DESCRIPTION OF THE DRAWINGS

The invention is explained in greater detail with reference to the following figures. The following is shown.

DETAILED DESCRIPTION

Figure 1:
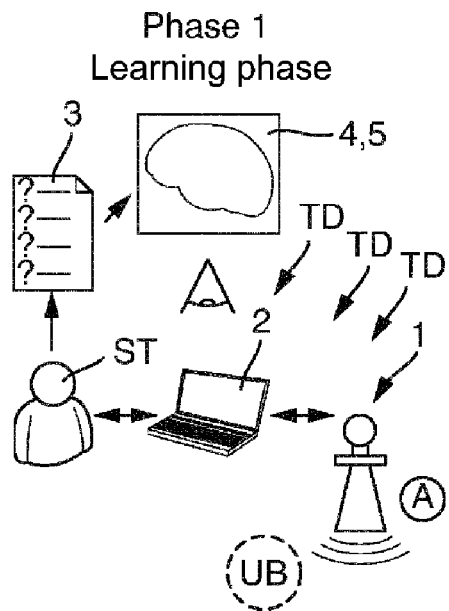
FIG. 1 shows a schematic representation of a learning phase, according to the present disclosure.

In order to carry out phase 1, the method steps described below are provided: A plurality of field devices 1n which determine or monitor different physical or chemical process variables in different applications An and under different environmental conditions UBn prevailing at the respective measuring positions of the field devices 1 are configured or parameterized by means of a configurations tool 2. For reasons of clarity, only one field device 1 is shown in an application A in each of the figures. The corresponding environmental conditions at the measuring position of the one field device 1 are identified by UB. According to the invention, however, these are a plurality of field devices 1n, which are installed at measurement positions MPn under different environmental conditions UBn in different applications An.

The configuration is usually performed by an experienced service technician ST, who has knowledge both of the field device 1 and of the process in which the field device 1 is located. The configuration data, the information about the respective applications An and the information about the environmental conditions UBn of the individual field devices 1 prevailing at the respective measurement positions are stored in a central data memory 4 as training data. The training data TD are made available to an adaptive computing program 5, which uses at least one artificial intelligence method. The learning data TD is used to train the adaptive computing program 5. The plurality of different field devices 1, which are installed in different applications An and under different environmental conditions UBn and have correspondingly adapted calibration data, are not shown in FIG. 1.

For configuring or parameterizing the field device 1, which is shown in FIG. 1 and which is to be configured, current information about its application A and the environmental conditions UB prevailing at the measuring position of the field device 1 to be configured are made available to the adaptive computing program 5. On account of such current information, based on the plurality of the training data TD, configuration data 3 from the adaptive computing program 5 are provided to the field device 1 to be configured, such configuration data being matched to the respective application A taking into account the environmental conditions UB prevailing at the measuring position of the field device 1 to be configured. These are, therefore, configuration data 3 which are highly likely to be suitable for the field device 1 and thus ensure and/or optimize its measurement performance under the given conditions. In principle, the adaptive computing program takes over the configuration or parameterization of the field device 1 at the end of phase 1.

Figure 2:
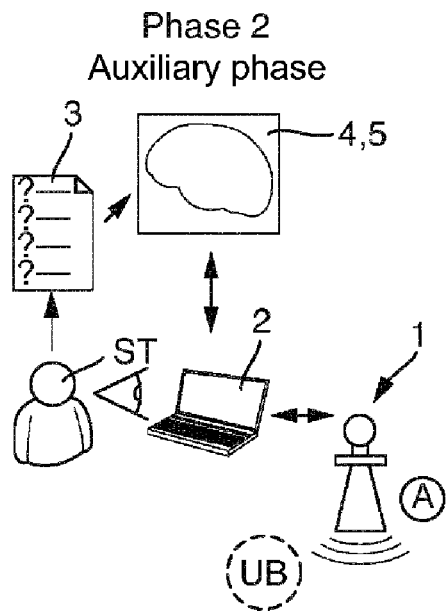
FIG. 2 shows a schematic representation of an auxiliary phase, according to the present disclosure.

In order to ensure that the configuration data are OK, it can be provided that the user confirms the setting proposed by the adaptive computing program. FIG. 2 shows a schematic representation of phase 2—the so-called "auxiliary phase"—for configuring the field device 1. It can also be provided that proposed configurations are provided to the user/service technician ST and the user has a selection option. Furthermore, questions from the adaptive program can be provided to the user/service technician ST in order to improve the reliability of the configuration data provided. In this phase, the adaptive computing program based on AI is a configuration aid. In addition or in the alternative, the adaptive computing program can also access a best-practice and/or known-issue database in order to have available all the information required for providing the appropriate configuration data. In particular, the adaptive program 5 can also retrieve stored information about known malfunctions and their appropriate correction.

Figure 3:
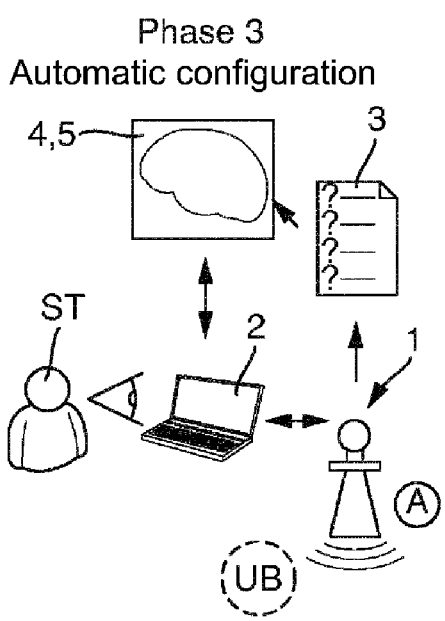
FIG. 3 shows a schematic representation of an automatic configuration, according to the present disclosure.

FIG. 3 shows a schematic representation of phase 3—automatic configuration—of a field device 1. In this phase, the proposals of the AI-based computing program for configuring the field devices 1 have already proven reliable. The adaptive computing program 5 takes over the configuration here. At that point, the adaptive computing program 5 no longer needs any further input from the service technician ST or from other information databases.

Figure 4:
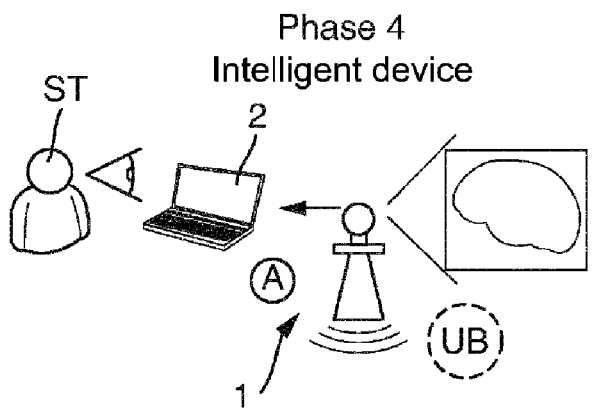
FIG. 4 shows a schematic representation of an intelligent configuration, according to the present disclosure.

FIG. 4 shows a schematic representation of phase 4. At that point, the field device 1 is an intelligent field device 1. The adaptive computing program 5 is, for example, permanently or temporarily integrated directly into the field device 1. The field device 1 is able to configure itself. The service technician ST is no longer required to configure the field device 1.

The invention claimed is:

1. A method for improving the measuring performance of a field device which is to be configured, is installed in a defined application and determines or monitors at least one defined physical or chemical process variable in an automation installation, having the following method steps:
    a plurality of field devices which determine or monitor different physical or chemical process conditions in different applications and under different environmental conditions prevailing at the respective measuring positions of the field devices are configured or parameterized by means of a configuration tool,
    the configuration data, the information relating to the respective applications and the information relating to the environmental conditions of the individual field devices prevailing at the respective measurement positions are stored in a central data memory as training data,
    the training data are made available to an adaptive computing program, which uses at least one artificial intelligence method,
    for the purpose of configuring or parameterizing the field device to be configured, current information relating to the particular application and the environmental conditions prevailing at the measuring position of the field device to be configured are made available to the adaptive computing program,
    on the basis of the current information, configuration data the adaptive computing program provides the field device to be configured with configuration data on the basis of the plurality of training data, which configuration data are matched to the particular application taking into account the environmental conditions prevailing at the measuring position of the field device to be configured.

2. The method of claim 1, wherein the configuration data and the current information about the respective application and the environmental conditions prevailing at the measuring position of the field device to be configured are stored in the central database.

3. The method of claim 2, wherein the training data for the adaptive computing program are obtained during start-up or within the framework of a maintenance or service assignment.

4. The method of claim 1, wherein in the event that a malfunction occurs at a field device, which requires a subsequent service or maintenance assignment of the service technician, information regarding the malfunction and information for correcting the malfunction is stored in the central data memory.

5. The method of claim 1, wherein in the event that a malfunction occurs at one of the field devices, which requires a subsequent service or maintenance assignment of the service technician, wherein the original configuration data are changed during the subsequent service or maintenance assignment, the original configuration data, also the original information about the respective application and the environmental conditions prevailing at the measuring position of the field device are replaced in the central data memory by the changed configuration data or changed information about the respective application and the environmental conditions prevailing at the measurement position of the field device.

6. The method of claim 1, wherein after the learning phase of the computing program, which uses at least one artificial intelligence method, the start-up, troubleshooting or maintenance of the field devices takes place via untrained operating personnel or automatically.

7. The method of claim 1, wherein, in the event that the respective application and the environmental conditions prevailing at the measuring position of the field device are known, the field device which is to be calibrated is preset with configuration data that are already matched to the respective application taking into account the environmental conditions prevailing at the measuring position of the field device which is to be configured.

8. The method of claim 1, wherein, in the event that, at a future point in time, a change is made to the configuration data of a field device in order to improve the measurement performance, then all field devices are provided, via untrained personnel or automatically, with corresponding changed configuration data which are matched to the respective application taking into account the environmental conditions prevailing at the respective measuring position of the field devices.

9. The method of claim 1, wherein the configuration data or changed configuration data, which are matched to the respective application taking into account the environmental conditions prevailing at the respective measuring position of the field devices, are provided via the Internet or intranet.

* * * * *